Figure 1:
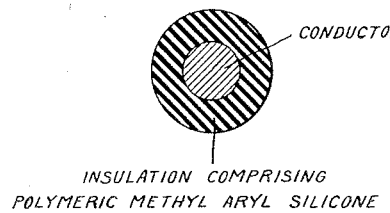

CONDUCTOR

INSULATION COMPRISING
POLYMERIC METHYL ARYL SILICONE

CONDUCTOR

INSULATION COMPRISING AN INTIMATE ASSOCIATION
OF FIBROUS MATERIAL AND A COMPOSITION COMPRISING
POLYMERIC METHYL ARYL SILICONE

Inventor:
Eugene G. Rochow,
by Harry E. Dunham
His Attorney.

Patented Oct. 7, 1941

2,258,222

UNITED STATES PATENT OFFICE 2,258,222

METHYL ARYL SILICONES AND INSULATED CONDUCTORS AND OTHER PRODUCTS UTILIZING THE SAME

Eugene G. Rochow, West Albany, N. Y., assignor to General Electric Company, a corporation of New York Application April 27, 1940, Serial No. 332,099

27 Claims. (Cl. 174—121)

The present invention relates to new compositions of matter and, more particularly, to compositions comprising new and useful methyl aryl silicones. The scope of the invention also includes products wherein these new compositions are utilized, for example insulated electrical conductors comprising a metallic conductor and insulation thereon comprising the new compositions of this invention. This application is a continuation-in-part of my copending applications Serial No. 287,787, filed August 1, 1939, and Serial No. 296,819, filed September 27, 1939, both of which applications are assigned to the same assignee as the present invention.

In the chemical literature, the name "silicone" is given to compounds of the general formula

and their polymers, where R and R' are the same or different alkyl or aryl radicals or any other organic radicals capable of direct union with the silicon atom.

With reference to the above formula, the products of this invention are those in which R is a methyl radical and R' is a halogenated or non-halogenated aryl radical; or, in polymeric form, products having the unit structure,

where A is any aryl radical, halogenated or non-halogenated.

In my copending application Serial No. 287,787 I showed the production of methyl silicones and defined such compounds in that application as chemical compounds composed essentially of silicon, oxygen and at least one methyl group attached directly to silicon.

In my copending application Serial No. 296,819 I disclosed the preparation of new and useful silicones in which either or both R and R' in the above formula are halogenated aryl radicals. When only one of the groupings is a halogenated aryl radical, the other may be an alkyl, aryl, aralkyl or other non-halogen-containing grouping capable of being attached directly to silicon. Examples of such halogenated silicones are di-(trichlorophenyl) silicone, di-(monobromophenyl) silicone, di-(monochlorotolyl) silicone, methyl trichlorophenyl silicone, etc. However, no specific claims were made in application Serial No. 296,819 to methyl halo-aryl silicones or to other alkyl halo-aryl silicones.

The claims in the present application differ from those in my above-identified copending applications in that they are directed to silicones and their polymers in which methyl groups and aryl groups are each attached directly to silicon atoms. Any aryl group may be introduced into the silicone structure in producing the methyl aryl silicones of this invention. Thus, the aryl radical may be, for example: phenyl, mono- and poly-alkyl phenyls, more specific examples of which are tolyl, xylyl, mono-, di- and tri-ethyl phenyls, mono-, di- and tri-propyl phenyls, etc.; naphthyl, mono- and poly-alkyl naphthyls, e. g., methyl naphthyl, diethyl naphthyl, tripropyl naphthyl, etc.; tetrahydronaphthyl; anthracyl; and the halogenated derivatives of such radicals, more particularly the chloro, fluoro, bromo and iodo derivatives of such radicals. Hence the silicones of the present invention include not only methyl aryl silicones, but also methyl halo-aryl silicones, e. g., methyl chlorophenyl silicone.

Any suitable method may be used in preparing the new silicones of this invention, the choice of the method being determined largely by the yield obtained. For example, these new chemical compounds may be prepared by hydrolyzing a mass containing a compound having the formula

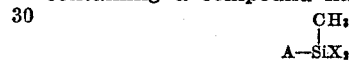

where A is an aryl (halogenated or non-halogenated) radical and X is a halogen atom, specifically a chlorine atom. The hydrolyzed product is dehydrated to form the corresponding silicone at normal (room) temperature, or more rapidly at elevated temperatures, and under atmospheric or subatmospheric pressure conditions.

In order that those skilled in the art better may understand how the present invention may be carried into effect, the following illustrative example thereof is given:

(1) Ether solutions of 1.35 mols phenyl magnesium bromide and of 2.19 mols methyl magnesium bromide were mixed and added slowly to an ether solution of 1.9 mols silicon tetrachloride. The reaction mixture was stirred and heated under reflux for several hours. Methyl phenyl derivatives of silicon tetrachloride are formed in accordance with several reactions, of which the following is illustrative:

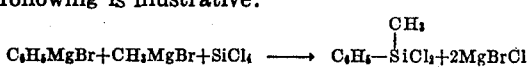

(2) The clear ether solution was decanted from the solid magnesium salts. The methyl phenyl magnesium dichloride contained in this ether solution was hydrolyzed by pouring the cold solution upon cracked ice:

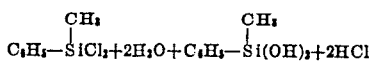

(3) The resulting hydroxy compounds or silicols were washed with water to remove excess acid, after which they were partly condensed to silicones by distilling off the ether and a part of the water. The resulting partial condensation products are insoluble in water, but soluble in organic solvents, e. g., benzene, toluene, etc.

Toluene was added to the ether-free mass and the solution boiled slowly for several hours to distill off more water of condensation, leaving a more viscous liquid polymer. This brownish, viscous resinous mass may be used directly as a coating and impregnating varnish.

It will be understood, of course, that the condensation from a silicol to a silicone is not a simple reaction, but one of gradual dehydration. Hence this liquid product of partial condensation (or polymerization), in toluene solution, is probably mainly a mixture of polymers or condensation products of the types

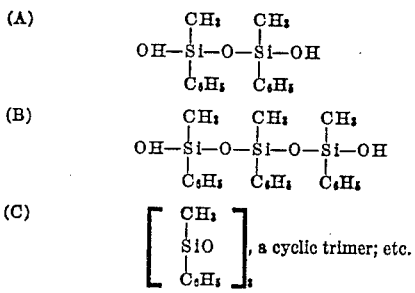

(4) The product of the preceding step may be polymerized or condensed further by additional heat treatment. For example, it may be polymerized in thin layers by heating for 30 minutes at 120° C. to remove the solvent (toluene), followed by further heating at about 150° to 225° C., e. g., for 15 to 25 minutes at 175° C. Thicker layers require a longer time, say 3 hours at 175° C. The resulting polymer is tough, strong, non-sticky, softens with heat but does not liquefy, and has no odor when cold. It represents a combination in one material of the properties of the thermo-setting, high-silicon-content methyl silicone with the properties of the oxidation-resistant aryl silicones. It is an excellent binder material, effectively wetting and bonding together masses of glass fibers. An analysis of this composition shows it to correspond with the formula

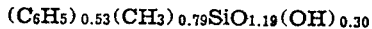

Further heating makes the resin harder by continued condensation. Samples of glass cloth treated with the less highly polymerized resin and then allowed to condense further in situ showed no cracking of the resin or any visual evidence of deterioration after one month at 175° C.

In the methyl aryl silicones of this invention the methyl and aryl groups may be attached to any or all of the silicon atoms in the molecule, or one methyl group may be attached to one silicon atom and one aryl group to another silicon atom. Ordinarily the polymeric silicone will have in its molecule an average of about one to not more than two total methyl and aryl groups, more particularly methyl and phenyl groups, per silicon atom; that is, the average ratio of the sum of the methyl and aryl groups per silicon atom, in the polymer, ranges from about one to not more than two. Polymeric methyl aryl silicones containing an average of less than two total methyl and aryl groups for each silicon atom are preferred. Products having good thermal resistance and a wide variety of applications are polymers containing an average of approximately 1 to approximately 1.4 total methyl and aryl groups per silicon atom. Silicones having an average of less than one total methyl and aryl groups per silicon atom also may be produced in accordance with the present invention. The average ratio of methyl groups to aryl groups for each silicon atom may be varied as desired or as conditions may require. For most applications of these new methyl aryl silicones I prefer that the average number of methyl groups per silicon atom exceed the average number of aryl groups per silicon atom.

The introduction of halogen atoms into the aryl nucleus of these methyl aryl silicones imparts flame resistance to the end-products. Thus, whereas non-halogenated methyl phenyl silicone burns upon application of a flame, the introduction of one halogen atom, specifically a chlorine atom, into the phenyl group renders the product less flammable. Similarly the introduction of two chlorine atoms into the phenyl group imparts greater flame resistance than one chlorine atom. Such mono- and di-halo derivatives may not be wholly flameproof. Hence for optimum flame resistance it is advantageous to introduce at least three halogen atoms, e. g., chlorine atoms, into the phenyl group. Similarly, with other aryl derivatives I may introduce any number of halogen atoms up to the limit of combining power of the particular nucleus. If desired, instead of introducing a single halogen such as chlorine into the aryl nucleus, a mixture of halogens, e. g., a mixture of chlorine and bromine, may be introduced therein.

The methyl aryl silicones of this invention ordinarily are resinous in character. In their final form as polymeric bodies they have the advantage of thermal stability greater than that of the ordinary coating and bonding agents. The partial condensation products or polymers are soluble, thermoplastic bodies. They polymerize slowly upon the application of heat. As the heating is continued, their solubility in organic solvents correspondingly decreases and they become harder at room temperature. The polymeric materials have good electrical properties. The highly polymerized bodies are unaffected by water, and they are able to resist temperatures of the order of 300° C. for prolonged periods of time without any great change in their physical properties. The highly polymerized bodies may be insoluble, or infusible, or insoluble and infusible resinous masses, depending upon the particular starting components, the proportions thereof and the conditions of polymerization.

As these new methyl aryl silicones are free from many of the limitations of the purely organic substances, they may be used to advantage with inorganic fillers and fibers such as asbestos, mica, glass fiber, and the like, to provide a composite insulation capable of withstanding higher temperatures than would be possible with the use of organic binders. This in turn permits the design of electrical machinery for operation at higher temperatures.

Figure 2:
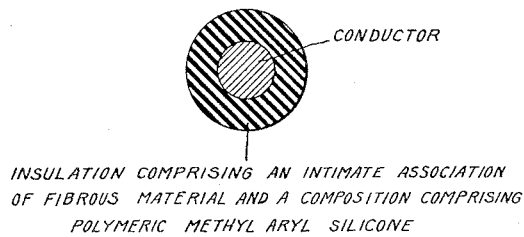

To illustrate how compositions comprising the herein-described methyl aryl silicones may be used in the field of insulation, the following examples are cited:

A liquid coating composition comprising partly polymerized methyl aryl silicone, e. g., methyl phenyl silicone, and a volatile solvent may be applied to a metallic conductor such as copper wire, which thereafter is heated to vaporize the solvent and to continue or complete the polymerization of the silicone in situ. In manufacturing certain kinds of electrical cables it may be desirable to wrap the conductor with an organic or an inorganic fibrous material such as asbestos, glass, cotton or paper before treating it with the solution. A further procedure is to coat and at least partly impregnate the wrapped conductor with a methyl aryl silicone, wind the thus insulated conductor into the desired coil, and then heat the wound coil to complete the polymerization of the silicone. In the accompanying drawing Fig. 1 represents a cross-sectional view of a metallic conductor provided with insulation comprising polymeric methyl aryl silicone; and Fig. 2 shows a similar view of a metallic conductor provided with insulation comprising an intimate association of fibrous material and a composition comprising polymeric methyl aryl silicone.

Sheet insulation may be prepared by treating woven or felted organic or inorganic fabrics or paper with compositions comprising a methyl aryl silicone. Sheet insulation also may be prepared by binding flaky inorganic substances with a methyl aryl silicone. For example, a methyl aryl silicone, specifically methyl phenyl silicone, may be used in the production of laminated mica products comprising mica flakes cemented and bonded together with the silicone.

Self-supporting coherent films or sheets of clay such as bentonite may be treated to advantage with compositions comprising a methyl aryl silicone. The silicone may be applied in melted or solution state. In the production of such sheet materials from bentonite, particles of bentonite of ultramicroscopic size are employed, for example particles having a maximum diameter of 3000 Å. (Ångstrom), more specifically from about 500 Å to about 2000 Å. Fibers such as glass may be embedded in, or otherwise associated with, such clayey films or sheets and the composite material treated, for instance coated, with a methyl aryl silicone. These methyl aryl silicone-treated bentonite and bentonite-glass fiber flexible sheet materials may be used to particular advantage for high temperature electrically insulating applications.

In addition to their use in the field of insulation, the methyl aryl silicones of this invention also may be used as protective coatings, for instance as coatings for base members such as glass bulbs and other articles of manufacture which are, or may be, exposed to abnormal heat conditions or to hot flying particles. They also may be used as sealing compositions, in the production of so-called resistance or semi-conducting paints, and for other applications as described more fully in my copending applications Serial Nos. 287,787 and 296,819 with particular reference to methyl silicones and halogenated aryl silicones.

In certain cases it may be desirable to copolymerize mixtures of compounds having a particular ratio of total methyl and aryl groups to silicon in the molecule of each individual compound. This may be done, for example, by mixing suitable proportions of, say, methyl phenyl silicon chlorides containing an average of 1 total methyl and phenyl groups per silicon atom with methyl phenyl silicon chlorides containing an average of say, 1.8 total methyl and phenyl groups per silicon atom, hydrolyzing the mixture and dehydrating the resulting product. In other cases, the separately hydrolyzed products may be mixed and thereafter dehydrated. However, in such cases the components should be mixed before condensation and polymerization have advanced to the point where the bodies become incompatible. For other applications it may be desirable to polymerize the individual silicones to solid form and then mix and grind the materials together to obtain a composite mass. In these and other ways compositions comprising methyl aryl silicone having properties best adapted for a particular application may be produced.

The individual, co-polymerized, or mixed methyl aryl silicones of this invention may suitably be incorporated into other materials to modify the properties of the latter. For example, they may be compounded with substances such as natural and synthetic rubber; tars, asphalts and pitches, more specific examples of which are wood tars, petroleum asphalts and vegetable pitches; natural resins such as wood rosin, copal, shellac, etc.; synthetic resins such as phenolaldehyde resins, urea-aldehyde resins, modified and unmodified alkyd resins, cumar resins, vinyl resins, esters of acrylic and methacrylic acids, etc.; cellulosic materials such as paper, inorganic and organic esters of cellulose such as cellulose nitrate (pyroxylin), cellulose acetate including the triacetate, cellulose propionate, cellulose butyrate, etc., cellulose ethers such as methyl cellulose, ethyl cellulose, benzyl cellulose, etc., as well as with various other organic plastic compositions. In certain cases the hard, brittle polymers may be pulverized and used as fillers for substances such as above mentioned. In other cases, especially when the methyl aryl silicone is compatible with the substance with which it is to be incorporated, it may be in the form of a liquid or relatively soft polymer of low molecular weight prior to compounding with the substance to be modified.

These new methyl aryl silicones also may be compounded with various other materials. For example, the hard, brittle polymers may be plasticized by the addition of suitable plasticizing agents, or the silicones of lower softening point themselves may be used as plasticizers of other normally brittle substances.

The low molecular weight polymers herein described also may be dissolved or dispersed in oils, such as linseed oil, Chinawood oil, perilla oil, soya bean oil, etc., alone or mixed with solvents, pigments, plasticizers, driers and other components of coating compositions to yield products which, when applied to a base member and air-dried or baked, have a high degree of heat resistance.

Laminated products may be made by superimposing organic or inorganic fibrous sheet materials coated and impregnated with a methyl aryl silicone, and thereafter bonding the sheets together under heat and pressure. Molding compositions and molded articles also may be formed from these new silicones. If desired, filling materials such as asbestos, glass fibers, talc, quartz powder, wood flour, etc., may be incorporated into such compositions prior to molding. Shaped articles are formed from such compositions under heat or under heat and pressure in accordance with practices now widely used in the plastics arts.

What I claim as new and desire to secure by Letters Patent of the United States is:

1. A composition of matter comprising methyl aryl silicone.
2. A composition of matter comprising methyl halo-aryl silicone.
3. Methyl aryl silicone.
4. Methyl halo-aryl silicone.
5. Polymeric methyl aryl silicone.
6. Polymeric methyl halo-aryl silicone.
7. Polymeric methyl phenyl silicone.
8. Polymeric methyl chloro-phenyl silicone.
9. A composition of matter comprising a mixture of polymers of methyl aryl silicones.
10. A resinous composition comprising polymeric methyl aryl silicone wherein the average ratio of the sum of the methyl and aryl groups per silicon atom is not more than two.
11. A product comprising polymeric methyl halo-aryl silicone wherein the average ratio of the sum of the methyl and halo-aryl groups per silicon atom is not more than two.
12. A product comprising polymeric methyl phenyl silicone wherein the average ratio of the sum of the methyl and phenyl groups is less than two.
13. Polymeric methyl phenyl silicone wherein the average ratio of the sum of the methyl and phenyl groups per silicon atom is between one and two.
14. Polymeric methyl chloro-phenyl silicone wherein the average ratio of the sum of the methyl and chloro-phenyl groups per silicon atom is between one and two.
15. A liquid coating composition comprising a volatile solvent and a partly polymerized, soluble methyl aryl silicone.
16. An article of manufacture comprising a base member having thereon a coating comprising an insoluble polymeric methyl aryl silicone.
17. The method of preparing new chemical compounds which comprises hydrolyzing a mass containing a compound having the formula

where A is an aryl radical and X is a halogen atom, and dehydrating the hydrolyzed product.

18. An article of manufacture comprising an inorganic sheet material treated with a composition comprising a polymeric methyl aryl silicone.
19. An article of manufacture comprising a sheet material formed of cohering particles of bentonite, said sheet material being treated with a composition comprising a polymeric methyl aryl silicone.
20. An article of manufacture comprising an intimate association of glass fibers and a composition comprising a polymeric methyl aryl silicone.
21. An article of manufacture comprising an intimate association of glass fibers and a composition comprising a polymeric methyl halo-aryl silicone.
22. An article of manufacture comprising an intimate association of asbestos and a composition comprising a polymeric methyl aryl silicone.
23. An insulated electrical conductor comprising a metallic conductor and insulation thereon comprising a polymeric methyl aryl silicone.
24. An electrical cable comprising a metallic conductor and insulation thereon comprising an intimate association of fibrous inorganic material and a composition comprising a polymeric methyl aryl silicone.
25. An insulated electrical conductor comprising a metallic conductor and insulation thereon comprising glass fibers associated with a composition comprising a polymeric methyl phenyl silicone.
26. An article having a surface provided with a coating comprising a methyl phenyl silicone in an insoluble, substantially completely polymerized state.
27. A composition comprising a mixture containing an organic plastic composition and a polymeric methyl aryl silicone.

EUGENE G. ROCHOW.